(12) United States Patent
Elsasser et al.

(10) Patent No.: US 8,534,255 B2
(45) Date of Patent: Sep. 17, 2013

(54) VALVE UNIT FOR AN INTERNAL COMBUSTION ENGINE AND INTERNAL COMBUSTION ENGINE

(75) Inventors: Alfred Elsasser, Keltern (DE); Uwe Grass, Stuttgart (DE); Bernd Mahr, Plochingen (DE); Marco Warth, Schorndorf (DE)

(73) Assignee: Mahle International GmbH (DE)

( * ) Notice: Subject to any disclaimer, the term of this patent is extended or adjusted under 35 U.S.C. 154(b) by 168 days.

(21) Appl. No.: 13/054,336

(22) PCT Filed: Jul. 13, 2009

(86) PCT No.: PCT/EP2009/058929
§ 371 (c)(1),
(2), (4) Date: Apr. 4, 2011

(87) PCT Pub. No.: WO2010/007026
PCT Pub. Date: Jan. 21, 2010

(65) Prior Publication Data
US 2011/0265754 A1 Nov. 3, 2011

(30) Foreign Application Priority Data
Jul. 18, 2008 (DE) .......................... 10 2008 033 885
Nov. 6, 2008 (DE) .......................... 10 2008 056 199

(51) Int. Cl.
*F01L 7/00* (2006.01)
*F01L 7/06* (2006.01)
(52) U.S. Cl.
USPC .................... 123/190.1; 123/568.11; 123/399

(58) Field of Classification Search
USPC ........... 123/399, 568.11, 190.8, 190.2, 190.1, 123/81 B, 81 R, 188.1
See application file for complete search history.

(56) References Cited

U.S. PATENT DOCUMENTS 4,125,098 A * 11/1978 Kiyota .......................... 123/443
4,216,758 A * 8/1980 Yoshioka ................... 123/198 F
(Continued)

FOREIGN PATENT DOCUMENTS

DE 2800680 A1 7/1979
DE 10153478 A1 5/2003
(Continued)

OTHER PUBLICATIONS

English abstract for DE-102007004264.
(Continued)

*Primary Examiner* — Mahmoud Gimie
(74) *Attorney, Agent, or Firm* — Rader, Fishman & Grauer PLLC

(57) ABSTRACT

The invention relates to a valve unit for at least one of influencing and controlling a gas flow in an internal combustion engine comprising at least one valve member for modifying a cross-section of a gas flow-carrying channel through which a fluid flows and a drive train for rotatingly driving the at least one valve member. The drive train comprises an input shaft, which is drivingly coupled to a drive device in the mounted state, and at least one valve member shaft which is non-rotationally connected to the valve member. It is especially advantageous if the drive train comprises at least one phase adjuster for drivingly coupling the input shaft and the valve member shaft, a rotational position of the shafts in relation to each other being adjustable by the phase adjuster.

20 Claims, 4 Drawing Sheets

(56) References Cited

U.S. PATENT DOCUMENTS

| | | | |
|---|---|---|---|
| 4,401,081 A * | 8/1983 | Wessel et al. | 123/692 |
| 4,494,504 A * | 1/1985 | Yagi et al. | 123/308 |
| 4,526,060 A * | 7/1985 | Watanabe | 475/4 |
| 4,738,229 A * | 4/1988 | Wada et al. | 123/184.55 |
| 4,840,349 A * | 6/1989 | Peter et al. | 251/129.11 |
| 5,040,508 A * | 8/1991 | Watanabe | 123/396 |
| 5,105,784 A | 4/1992 | Davis et al. | |
| 5,711,265 A | 1/1998 | Duve | |
| 6,085,712 A * | 7/2000 | Ma | 123/184.42 |
| 7,814,885 B2 | 10/2010 | Mitobe et al. | |
| 2003/0116108 A1 | 6/2003 | Wallis | |

FOREIGN PATENT DOCUMENTS

| | | |
|---|---|---|
| DE | 60112080 T2 | 4/2006 |
| DE | 102007004264 A1 | 7/2008 |
| EP | 1705351 A2 | 9/2006 |
| EP | 1882848 A1 | 1/2008 |
| GB | 2180298 A | 3/1987 |
| JP | 56-113006 A | 9/1981 |
| JP | 4-47123 | 2/1992 |

OTHER PUBLICATIONS

English abstract for JP56-113006.
English abstract for DE-10153478.

* cited by examiner

VALVE UNIT FOR AN INTERNAL COMBUSTION ENGINE AND INTERNAL COMBUSTION ENGINE

CROSS-REFERENCES TO RELATED APPLICATIONS

This application claims priority to German patent applications DE 10 2008 033 885.0 filed on Jul. 18, 2010; DE 10 2008 056 199.1, filed on Nov. 16, 2008, and PCT/EP2009/058929, filed on Jul. 13, 2009, all of which are hereby incorporated by reference in their entirety.

TECHNICAL FIELD

The present invention relates to a valve unit for influencing and/or controlling a gas flow in an internal combustion engine, in particular of a motor vehicle. The invention relates also to an internal combustion engine having at least one such valve unit.

BACKGROUND

Valve units usually have a valve member by means of which a cross-section of a gas flow-conveying channel through which a fluid can flow can be changed. For this, the valve member can be actuated discontinuously to be able to adjust it between discrete switching positions. Once such discrete switching positions are reached, the valve member has to be stopped. In order to be transferred into another switching position, the valve member has to be appropriately accelerated. In case of short switching times and/or short time intervals between successive switching operations, a comparatively high amount of energy for decelerating and accelerating the valve member is necessary. A drive device which is suitable for this has a comparatively complicated structure and, accordingly, can be expensive.

Alternatively, such a valve member can also be actuated continuously. For example, the valve member rotates about an axis and runs through different switching states with each rotation. Such a valve member can be permanently driven. By varying the rotational speed, different switching frequencies or switching times can be implemented.

A valve unit of the aforementioned type can be used in a motor vehicle for adjusting the exhaust gas recirculation rate. For this purpose, the associated valve member can be arranged in a fresh air path of the internal combustion engine so that, by periodically opening and closing the cross-section through which a fluid can flow, pressure oscillations are generated or amplified by means of which the exhaust gas recirculation rate can be adjusted. By the pressure oscillations generated by means of the valve unit in the fresh air path, among other things, oscillation phases with a comparatively low pressure are generated which allow or facilitate that exhaust gas can flow over from a recirculation line into a fresh air path. Thereby, it is in particular also possible to achieve an exhaust gas recirculation on the pressure side of a charging device in a supercharged internal combustion engine.

Additionally or alternatively, such a valve unit can also be arranged in a recirculation line in order to generate or amplify pressure oscillations by periodically opening and closing the cross-section through which a fluid can flow by means of the valve member. Said pressure oscillations have oscillation phases with a relatively high pressure which allow or facilitate that the exhaust gas flows over from the recirculation line into a fresh gas path. Here too, the use in a supercharged internal combustion engine can be implemented, wherein the recirculated exhaust gas is conveyed into the high pressure side of the fresh air path.

SUMMARY

The present invention is concerned with the problem to provide for a valve unit of the aforementioned type and for an internal combustion engine equipped therewith, an advantageous embodiment which is in particular characterized in that it can be implemented in a comparatively inexpensive manner and/or that it has an improved functionality.

This problem is solved according to the invention by the subject matters of the independent claims. Advantageous embodiments are subject matter of the dependent claims.

The invention is based on the general idea to arrange in a valve unit having a permanently driven valve member, a phase adjuster in a drive train for rotatingly driving the valve member, and to arrange the phase adjuster between a rotatably driven input shaft and a valve member shaft driving the valve member in such a manner that a rotational position of the two shafts relative to each other can be adjusted depending on the requirements. Due to the variation of the rotational position of the drive train's input side formed by the input shaft relative to the drive train's output side formed by the valve member it is possible to move, within the rotational movement, the closing phases and the opening phases of the valve member forwards or backwards or, respectively, towards an early or retarded position. Furthermore, in case of a dynamic actuation of the actuator, it is possible to change the length or the circumferential portion of the opening phases and closing phases within the rotational movement.

Thus, the proposed construction allows a change of the virtually rigid coupling between input shaft and valve member, whereby it is possible also in case of a permanently driven drive train to vary the actuation of the valve member. Therefore, the valve unit as well as the internal combustion engine equipped therewith achieves an increased functionality.

According to a particular embodiment, the phase adjuster can be configured as addition gearing. Such an addition gearing is characterized in that it can superimpose an input-side second rotational movement to an input-side first rotational movement and then provides the superimposed rotational movement quasi as sum on the output side. A typical example for such an addition gearing is a planetary gearing. Accordingly, in an advantageous development, the phase adjuster can be designed as planetary gearing. Advantageously, the latter is mounted in such a manner that a sun gear of the planetary gearing is drivingly coupled with the input shaft while a planetary gear carrier carrying gears of the planetary gearing is drivingly coupled with the valve member or vice versa. The sun gear and the planetary gear carrier are drivingly coupled to each other via a non-rotating annulus gear. By means of a suitable actuator, the annulus gear can be changed with respect to its rotational position. Hereby, a rotational position of the drive gear relative to the valve member can be varied.

Particularly advantageous is an embodiment in which the drive train has an actuatable coupling which is connected on the input side in a rotationally fixed manner to an input section of the input shaft, wherein the coupling is connected in a rotationally fixed manner on the output side to an output section of the input shaft. In a coupled state, the coupling provides a rotationally fixed connection between the two sections of the input shaft and, in a decoupled state, allows rotational movements of the sections relative to each other. In other words, by means of a coupling actuatable in such a manner, the valve member can be decoupled from the drive train or can be connected thereto. Hereby, the functionality of the valve unit and the internal combustion engine can be further increased.

Further important features and advantages arise from the sub-claims, from the drawings, and from the associated description of the figures based on the drawings.

It is to be understood that the above mentioned features and the features yet to be explained hereinafter can be used not only in the respectively mentioned combination but also in other combinations or alone without departing from the context of the present invention.

BRIEF DESCRIPTION OF THE DRAWING

Preferred exemplary embodiments of the invention are illustrated in the drawings and are explained in the following description in more detail, wherein identical reference numbers refer to identical, or similar, or functionally identical components.

In the figures, schematically.

DETAILED DESCRIPTION

Figure 4:
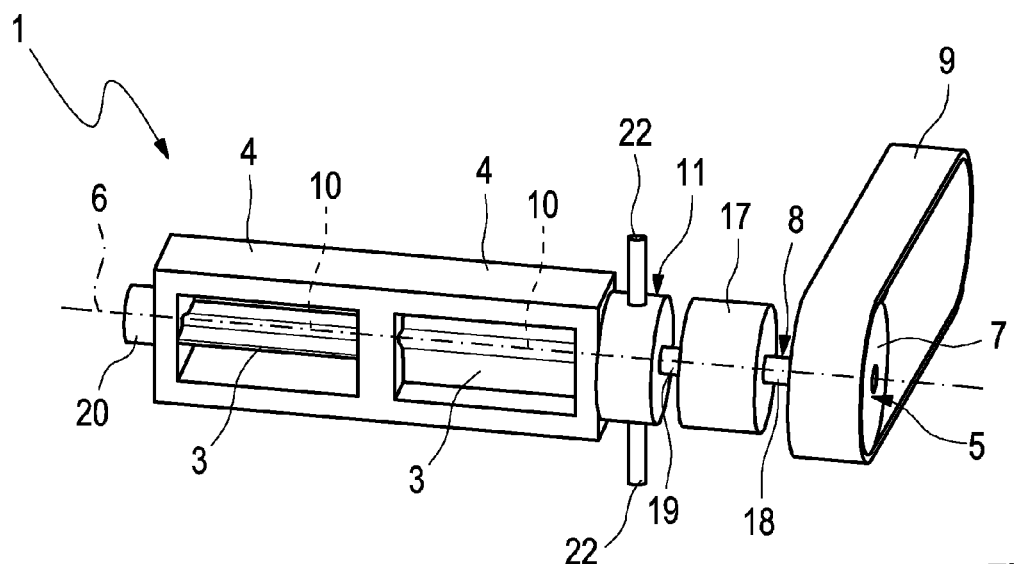
Figure 5:
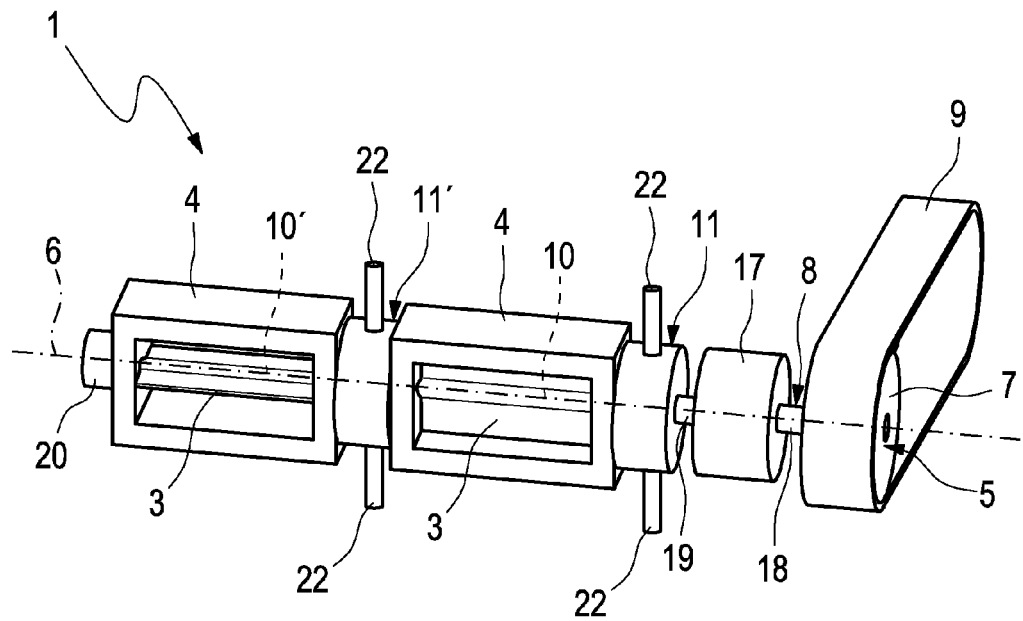
Figure 6:
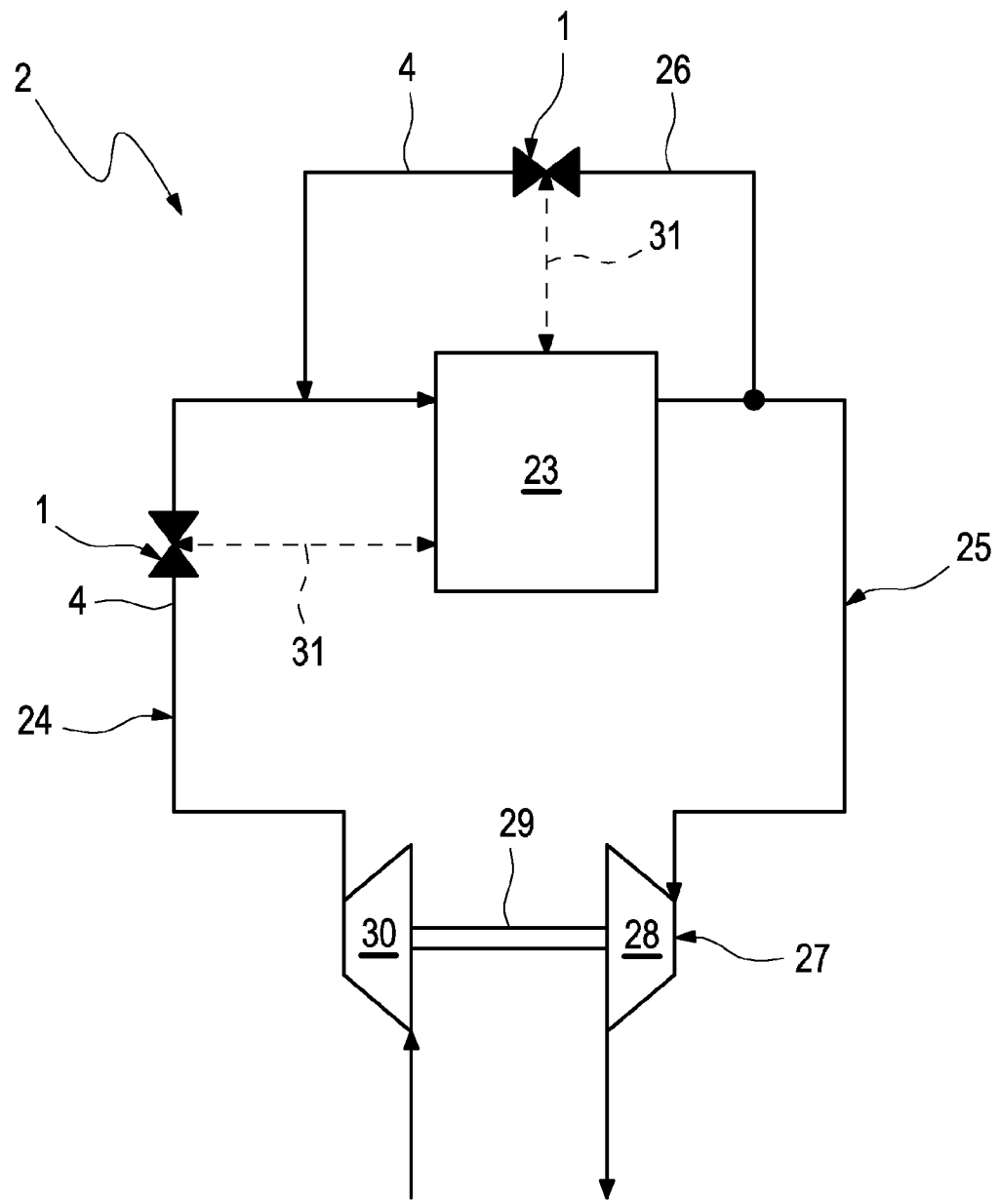
FIG. 6 shows a greatly simplified circuit diagram-like basic illustration of an internal combustion engine having at least one such valve unit.

According to the FIGS. 1-5, a valve unit 1 by means of which a gas flow of an internal combustion 2 illustrated in FIG. 6 can be influenced or controlled comprises at least one valve member 3. By means of the valve member 3, a cross-section of a channel 4 through which a fluid can flow can be changed. FIGS. 1-5 show a channel section which is also designated with 4 and which forms an integral part of the valve unit 1 and which can be mounted into a corresponding channel of the internal combustion engine 2. The internal combustion engine 2 is preferably arranged in a motor vehicle.

The valve unit 1 comprises a drive train 5 by means of which the at least one valve member 3 can be rotatably driven. In doing so, the valve member 3 rotates about a rotational axis 6. Said drive train 5 has, e.g., a drive wheel 7 which is connected to an input shaft 8 in a rotationally fixed manner. In the mounted state, said drive wheel 7 is preferably permanently coupled with a drive device 31, which is indicated only in FIG. 6, in such a manner that the drive device 31 drives the drive wheel 7 in a rotatable manner. Then, the drive wheel 7 rotates also about the rotational axis 6. This drive device 31 can principally involve any drive. For example, an electric motor can be provided. The drive coupling which is suitably also designated with 31, is indicated in the example of the FIGS. 1 to 5 by a drive belt 9 between the respective drive device and the drive wheel 7. However, other drive couplings 31 are principally also conceivable such as, for example, V-belts, chains, gear wheels and the like. Preferably, the drive device 31 is not an additional drive but a device which is present in the internal combustion engine 2 anyway. For example, this involves a shaft which is driven by the internal combustion engine during the operation of the same such as, for example, a crankshaft or a camshaft. Hereby, it is possible to implement in particular a permanent drive of the drive wheel 7 can be implemented as soon as the internal combustion engine 2 is in operation. Furthermore, such a drive coupling 31 between drive wheel 7 and internal combustion engine 2 results in that the drive wheel 7 is always driven at a speed proportional to the speed of the internal combustion engine 2. Moreover, the drive train 5 has at least one valve member shaft 10 which is connected to the valve member 3 in a rotationally fixed manner.

Figure 7:
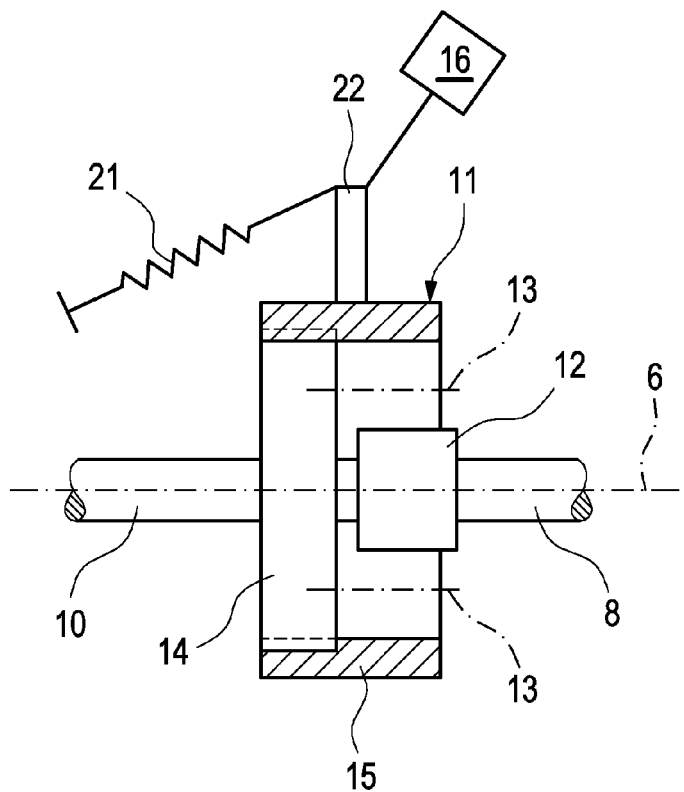
FIG. 7 shows a greatly simplified sectional view of a planetary gearing.

Further, the drive train 5 has at least one phase adjuster 11 which, in the shown preferred example, is configured as planetary gearing 11. However, other mechanically working addition drives are principally also advantageous. Principally, a hydraulically or pneumatically working phase adjuster can also be used. According to FIG. 7, the preferred planetary gearing 11 comprises in a usual design, one sun gear 12, a plurality of planetary gears 13, one planetary gear carrier 14 and one annulus gear 15. The planetary gears 13 are rotatably mounted at the planetary gear carrier 14 and engage with the centrally arranged sun gear 12. Moreover, the planetary gears 13 engage with the annulus gear 15. According to the FIGS. 1-5, the planetary gearing 11 or any other addition gearing 11 or any other phase adjuster 11 serves for adjusting a rotational position of the input shaft 8 relative to the valve member shaft 10. For this purpose, the respective phase adjuster 11, here the planetary gearing 11, establishes a drive coupling between the input shaft 8 and the valve member shaft 10. For this, the sun gear 12 of the planetary gearing 11 is connected in a rotatably fixed manner to the one shaft, for example to the input shaft 8, while the planetary gear carrier 14 is connected in a rotatably fixed manner to the other shaft, thus, for example, to the valve member shaft 10. It is obvious that a reversed configuration can principally also be implemented, wherein the sun gear 12 is connected in a rotatably fixed manner to the valve member shaft 10, while the planetary gear carrier 14 is connected in a rotatably fixed manner to the input shaft 8. With the annulus gear 15 standing still, thus, with the annulus gear 15 being fixed relative to the environment of the drive train 5, the valve member shaft 10 and the input shaft 8 are drivingly and forcibly coupled to each other. However, by changing the absolute rotational position of the annulus gear 15, the relative rotational position between the shafts 8, 10 coupled to each other via the planetary gearing 11 can be varied or, respectively, adjusted. FIG. 7 shows a greatly simplified actuator 16 by means of which the annulus gear 15 can be actuated in a rotatable manner. With said actuator 16, the annulus gear can carry out rotations about the rotational axis 6 which are in particular angularly limited.

Figure 1:
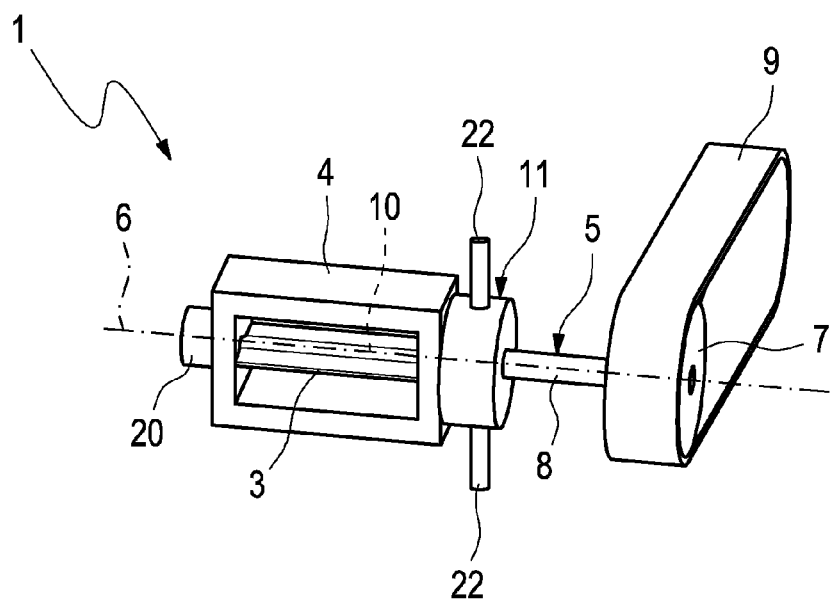
FIGS. 1-5 each show a greatly simplified, basic perspective view of a valve unit in different embodiments.
Figure 2:
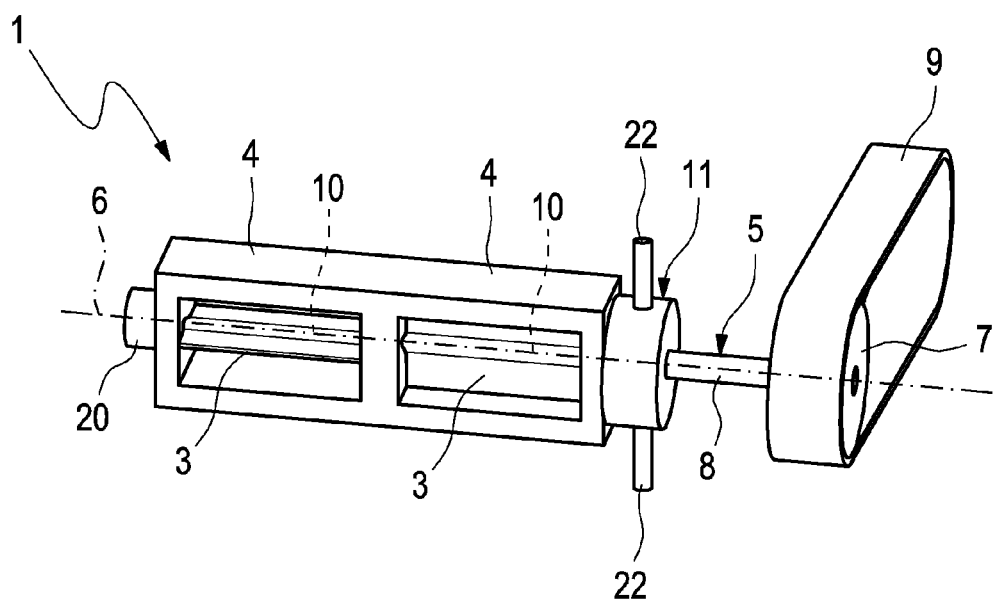

FIGS. 2, 4 and 5 show embodiments in which two valve members 3 are provided. In the exemplary embodiments shown in the FIGS. 2 and 4, the latter are rotationally fixedly connected to the same valve member shaft 10. In the example, the two valve members 3 are rotated relative to each other, thus, are arranged in different rotational positions on the common valve member shaft 10. Here, the two valve members 3 are arranged in two separate channels 4 or channel sections 4. In the embodiments of the FIGS. 2, 4 and 5, the two channel sections 4 form an integrally producible structural unit.

Figure 3:
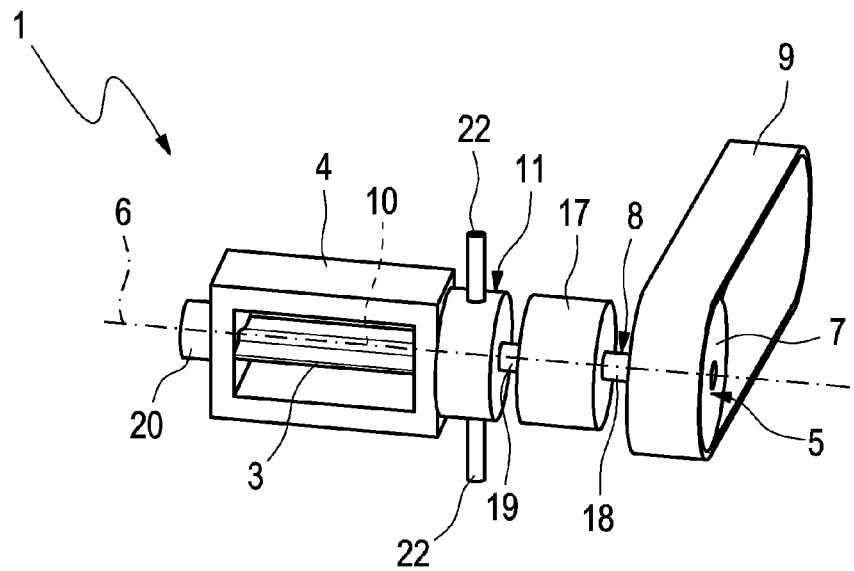

In the embodiments of FIGS. 3-5, the drive train 5 is also equipped with an actuatable coupling 17. Said coupling 17 which, for example, can be actuated hydraulically or electrically or pneumatically is rotationally fixedly connected on the input side to an input section 18 of the input shaft 8. On the output side, the coupling 17 is rotationally fixedly connected to an output section 19 of the input shaft 8. Further, the coupling 17 can be switched between a coupled state and a decoupled state. In the coupled state, the two shaft sections 18, 19 are connected to each other in a rotationally fixed manner. In the decoupled state, the two shaft sections 18, 19 can be rotated relative to each other. In the decoupled state, the coupling 17 thus allows a relative rotational movement between the sections 18, 19 of the input shaft 8. Since the coupling 17 is integrated in the input shaft 8, the coupling is located within the drive train 5 between the drive wheel 7 and the phase adjuster 11 or, respectively, the planetary gearing 11. It is principally also conceivable to integrate the coupling 17 between the phase adjuster 11 or the planetary gearing 11 and the valve member 3 into the valve member shaft 10.

Thus, by means of the coupling 17, the rotational movement of the valve members 3 can be stopped even if the drive wheel 7 is still permanently driven. For example, conceivable for the internal combustion engine 2 are operational states in which the valve unit 1 or, respectively, a periodical opening and blocking of the respective channel 4 is not desired. Furthermore, errors can occur. The possibility of decoupling the respective valve member 3 from the respective drive device or, respectively, from the drive wheel 7 then provides an emergency function for the internal combustion engine 2.

According to the FIGS. 1-5, the valve unit 1 can additionally be equipped with a sensor 20 by means of which the absolute rotational position of the respective valve member 3 or the two valve members 3 can be determined.

In the embodiment shown in FIG. 5 as well as in the embodiments of the FIGS. 2 and 4, two valve members 3 are provided to vary or control the cross-sections, through which a fluid can flow, in two separate channels or channel sections 4. While in the embodiments of the FIGS. 2 and 4, the two valve members 3 are rotationally fixedly connected to a common valve member shaft 10, the drive train 5 of the embodiment shown in FIG. 5 has two separate valve member shafts 10 and 10', each of which is rotationally fixedly connected to one of the valve members 3. Furthermore, the embodiment of FIG. 5 is equipped with an additional or further phase adjuster 11' by means of which the two valve member shafts 10, 10' are drivingly coupled to each other. The further phase adjuster 11' can again be configured as planetary gearing 11' or as any other suitable addition gearing 11'. Said further or second planetary gearing 11' has principally the same structure as the previously described first planetary gearing 11. Here, the sun gear 12 of the second planetary gearing 11' is rotationally fixedly connected to the one valve member shaft 3 while the planetary gear carrier 14 is rotationally fixedly connected to the other valve member shaft 3. Here too, the annulus gear 15 can be rotationally actuated by means of a suitable actuator in order to be able to fix or adjust or, respectively, vary the relative rotational position of the two valve members 3 with respect to each other. Through this configuration it is possible to change the quasi synchronously rotating valve members 3 with respect to their relative rotational position.

Advantageously, the second planetary gearing 11 is configured in such a manner that, when the annulus gear 15 stands still, it transmits the rotational movement of the one valve member shaft 10 without speed transformation, thus 1:1, to the other valve member shaft 10'. Independent of this, the previously described or first planetary gearing 11 can couple the two shafts coupled to the planetary gearing, namely the input shaft 8 and the valve member shaft 10, to each other without speed transmission, thus without speed change. Alternatively, a gear ratio or a gear reduction is also conceivable for this planetary gearing 11.

According to FIG. 7, a reset spring 21 can be allocated to the respective phase adjuster 11 or addition gearing 11 or, respectively, planetary gearing 11, which spring is illustrated in FIG. 7 merely in a cursory manner and which drives the two shafts 8, 10, 10' into a relative initial position. In the example, said reset spring 21 thus serves for driving the annulus gear 15 into an initial position. For this purpose, the reset spring 21 engages with the annulus gear 15. Alternatively, the reset spring 21 can also engage with the actuator 16. For transmitting a torque into the annulus gear 15 in order to rotate the annulus gear 15 about the rotational axis 6, an actuating pin 22 can be attached to the annulus gear 15, which pin projects from the annulus gear 15 in the shown examples. In the embodiments of the FIGS. 1-5, the respective planetary gearing 11 or, respectively, 11' is equipped on its annulus gear 15 in each case with two such actuating pins 22. The one actuating pin 22 serves, for example, for coupling the respective planetary gearing 11, 11' to the actuator 16, while the other actuating pin 22 then advantageously serves for coupling the respective planetary gear 11, 11' to the reset spring 21.

According to FIG. 6, the internal combustion engine 2 comprises an engine block 23, a fresh air path 24 for supplying fresh air to the engine block 23 and an exhaust gas path 25 for discharging exhaust gases from the engine block 23. Furthermore, a recirculation line 26 is provided here which allows to recirculate exhaust gas from the exhaust gas path 25 to the fresh air path 24. It is obvious that said recirculation line 26 can also run, at least partially, within the engine block 23.

In the example, the internal combustion engine 2 is also equipped with a charging device 27. As an example, this can involve an exhaust gas turbocharger, the turbine 28 of which is arranged in the exhaust gas path 25 and is rotationally fixedly connected via a shaft 29 to a compressor 30 which is arranged in the fresh air path 24. It is particularly useful to connect the recirculation line 26 on the exhaust gas side upstream of the turbine 28 to the exhaust gas path 25 in order to be able to provide a pressure level as high as possible in the exhaust gas to be recirculated. Furthermore, it is useful to connect the recirculation line 26 downstream of the compressor 30 to the fresh air path 24 to prevent contamination, for example by soot, of the compressor 30.

The internal combustion engine 2 can have at least one valve unit 1 of the above described design. For example, such a valve unit 1 is mounted in the fresh air path 24. In the region in which the valve unit 1 is integrated, the fresh air path 24 has a channel 4 which is suitable for this. Alternatively, such a valve unit 1 can be mounted in the recirculation line 26 which, at the mounting location of the valve unit 1, is configured as channel 4. Furthermore, also conceivable is an embodiment in which one such valve unit 1 can be arranged in each case in the fresh air path 24 as well as in the recirculation line 26. In any case, the respective valve unit 1 is present in addition to the gas exchange valves of the internal combustion engine 2 or the engine block 23. The respective valve unit 1 is arranged here in the fresh air path 24 or the recirculation line 26 upstream of the gas exchange valves.

The aforementioned drive device 31 for driving the drive wheel 7 can be formed—as illustrated—by a component driven during the operation of the internal combustion engine 2, for example by the engine block 23. For example, this involves a crankshaft or a camshaft. It is also possible to implement a coupling with a toothed belt driven by the crankshaft or with a V-belt or the like also driven by the crankshaft. A corresponding drive coupling 31 between the drive train 5 of the respective valve unit 1 with the engine block 23 is indicated in FIG. 6 by a double arrow with a broken line and designated with 31. In particular, the respectively selected drive device 31 is configured for permanently driving the drive wheel 7 during the operation of the internal combustion engine 2. The drive device, which can also be designated with 31, preferably forms an integral part of the internal combustion engine 2 or the engine block 23. Furthermore, the respective drive device 31 is suitably configured for driving the drive wheel 7 at a speed which is proportional to the drive speed of the crankshaft of the internal combustion engine 2. By synchronizing the drive train 5 of the valve unit 1 with the speed of the internal combustion engine 2, a clear allocation to the gas exchange processes in the individual cylinders of the internal combustion engine 2 takes place. If the crankshaft angle is known, it is also possible to specifically match the switching processes of the valve unit 1 with the gas exchange processes.

The valve unit 1 preferably serves for adjusting an exhaust gas rate of the exhaust gas recirculation system. For example, by means of the valve unit 1 arranged in the fresh air path 24, pressure oscillations can be generated in the fresh air, which oscillations reach comparatively low pressures in the region of their negative oscillation amplitudes even if the valve unit 1—as in the example shown in FIG. 6—is arranged, with respect to the charging device 27, on the pressure side of the fresh air path 24. In particular by utilizing fluid dynamic effects it is possible in a relatively simple manner to generate or amplify periodically repeating pressure regions within the pressure oscillation, which pressure regions lie below the pressure of the exhaust gas to be recirculated in the recirculation line 26. By controlling or utilizing the pressure oscillations in the fresh air path 24 it is thus possible to control or adjust the exhaust gas recirculation rate.

In contrast to that, the valve unit 1 arranged in the recirculation line 26 can be utilized for generating or amplifying pressure oscillations in such a manner that pressures occur in the region of positive oscillation amplitudes, which pressures lie above the pressure of the fresh air in the fresh air path 24. This also applies in particular if the recirculation line 26—as in the example shown in FIG. 6—is connected to the pressure side of the fresh air path 24. Thus, by controlling the pressure oscillations in the recirculation line 26, the exhaust gas recirculation rate can be adjusted.

The above described two forms of utilization of the valve unit 1 in an internal combustion engine 2 can be implemented alternatively as well as cumulatively. Principally, other mounting situations for the valve unit 1 are also conceivable. For example, such a valve unit 1 can also be arranged in the exhaust gas path 25 downstream of the connection point between recirculation line 26 and exhaust gas path 25 so as to bring the pressure in the exhaust gas to an increased pressure level by periodically back-pressuring.

Due to the permanent or forced speed coupling between crankshaft and the at least one valve member 3, the gas exchange processes and the opening movements or, respectively, closing movements of the valve member 3 work synchronously. For example, to be able to vary the exhaust gas recirculation quantity at a certain operating point of the internal combustion engine, a time shift between the gas exchange processes and the closing processes or, respectively, opening processes of the respective valve member 3 can be implemented by means of the mentioned actuator 16. In these settings, the actuator 16 is "statically" actuated, that is, a certain relative rotational position between the shafts 8, 10 coupled with the respective phase adjuster or planetary gearing 11, 11' is set and maintained at least temporarily. It is principally also possible to actuate the actuator 16 dynamically, whereby it is in particular also possible to vary the opening phases or closing phases of the respective valve member 3. This can also be utilized for changing the exhaust gas recirculation rate.

With respect to the associated valve member 3, the respective valve member shaft 10 can be a separate component which is rotationally fixedly connected in a suitable manner to the associated valve member 3. It is also possible to structurally integrate the respective valve member shaft 10 into the associated valve member 3. In the embodiments shown herein, the valve member 3 is configured in each case as flap valve, in particular as butterfly valve. It has a rectangular cross-section. Other cross-sections for the flap-shaped valve member 3 are also conceivable. Alternatively, the valve member can also be configured as rotary slide valve or the like.

The invention claimed is:

1. An internal combustion engine, comprising: at least one gas flow channel; a valve unit configured within the channel, wherein the valve unit at least one of influences and controls a gas flow, wherein the valve unit has at least one valve member for changing a cross-section of the gas flow channel through which a fluid can flow; and a drive train for rotatingly driving the at least one valve member, wherein the drive train has an input shaft and is coupled on an input side to a drive device for rotatingly driving the input shaft, wherein the drive train has at least one valve member shaft, which is rotationally fixedly connected to the valve member, wherein the drive train has at least one phase adjuster for drivingly coupling the input shaft to the valve member shaft, wherein at least one of the phase adjuster and a rotational position of the input shaft relative to the valve member shaft can be varied, wherein the valve unit is arranged in a fresh air path of the internal combustion engine and is configured for adjusting an exhaust gas recirculation rate of an exhaust gas recirculation device, which has a recirculation line connected to the fresh air path, wherein the drive train has an actuatable coupling, which on the input side is rotationally fixedly connected to an input section of the input shaft, which on the output side is rotationally fixedly connected to an output section of the input shaft, which in a coupled state rotationally fixedly connects the two sections of the input shaft to each other, and in a decoupled state, allows rotational movements of the sections of the input shaft relative to each other.

2. The internal combustion engine according to claim 1, wherein the fresh air system is configured as a double-flow system with two paths through which fluid can flow, wherein the valve unit has two valve members, which each are allocated to one flow for changing the cross-section through which a fluid can flow, wherein each of the two valve members controls the cross-section of one of the respective two paths, and wherein when one valve member minimizes the cross-section through which the fluid can flow, the second valve member maximizes the cross-section through which fluid can flow.

3. The internal combustion engine according to claim 1, wherein the drive device is configured for permanently driving the input shaft during the operation of the internal combustion engine.

4. The internal combustion engine according to claim 1, wherein the drive device for driving the input shaft is configured with a drive speed, which is proportional to the speed of a crankshaft of the internal combustion engine.

5. The internal combustion engine according to claim 1, wherein the valve unit is arranged upstream of at least one of the gas exchange valve members of the internal combustion engine in the respective channel.

6. The internal combustion engine according to claim 1, wherein the drive train has a drive wheel on the input side, which is rotationally fixedly connected to the input shaft, and is coupled to the drive device in the mounted state of the valve unit for rotatingly driving the drive wheel.

7. The internal combustion engine according to claim 1, wherein the at least one phase adjuster is configured as an addition gearing.

8. The internal combustion engine according to claim 1, wherein the at least one phase adjuster is configured as a planetary gearing, wherein a sun gear of the planetary gearing is rotationally fixedly connected to one shaft, and planetary gears of the planetary gearing are mounted on a planetary gear carrier which is rotationally fixedly connected to the other shaft or, wherein the one shaft and the other shaft are either the input shaft or the valve member shaft, and wherein an annulus gear of the planetary gearing is fixable and rotatingly actuatable by means of an actuator for adjusting a rotational position of the two shafts.

9. The internal combustion engine according 1, wherein two valve members are provided which are rotationally fixedly connected to the same valve member shaft, wherein the two valve members are arranged rotated relative to each other on the common valve member shaft.

10. The internal combustion engine according to claim 1, wherein a reset spring is allocated to the respective phase adjuster, and wherein the spring drives the respective phase adjuster for adjusting an initial rotational position of the shafts relative to each other.

11. The internal combustion engine according to claim 1, further comprising at least one sensor, the sensor determines a rotational position of at least one valve member.

12. An internal combustion engine according to claim 1, further comprising at least one channel section in which the respective valve member is arranged in a rotationally adjustable manner and is mounted in the channel.

13. The internal combustion engine according to claim 1, wherein the drive train has a drive wheel on the input side, which is rotationally fixedly connected to the input shaft, and is coupled to the drive device in the mounted state of the valve unit for rotatingly driving the drive wheel.

14. An internal combustion engine, comprising:
at least one gas flow channel;
a valve unit configured within the channel, wherein the valve unit at least one of influences and controls a gas flow, wherein the valve unit has at least one valve member for changing a cross-section of the gas flow channel through which a fluid can flow; and
a drive train, including at least one input shaft, at least one valve member shaft, at least one phase adjuster and an actuateable coupling, wherein the drive train rotatively drives the at least one valve member, the input shaft is coupled to a drive device on an input side of the input shaft, the valve member shaft is connected in a rotatively fixed manner to the valve member, wherein the phase adjuster drivingly couples the input shaft to the valve member shaft; wherein the actuatable coupling is rotationally fixedly connected to an input section of the input shaft on the input side, and is rotationally fixedly connected to an output section of the input shaft on an output side, and wherein the two sections of the input shaft are rotationally fixedly connected to each other when in a coupled state, and rotational movement of the sections of the input shaft relative to each other is allowed in a decoupled state.

15. The internal combustion engine according to claim 14, wherein at least one of the phase adjuster and a rotational position of the input shaft relative to the valve member shaft can be varied, and wherein the valve unit is arranged in a fresh air path of the internal combustion engine and is configured for adjusting an exhaust gas recirculation rate of an exhaust gas recirculation device, which has a recirculation line connected to the fresh air path.

16. The internal combustion engine according to claim 14, wherein the drive device is configured for permanently driving the input shaft during the operation of the internal combustion engine.

17. The internal combustion engine according to claim 14, wherein the drive device for driving the input shaft is configured with a drive speed, which is proportional to the speed of a crankshaft of the internal combustion engine.

18. The internal combustion engine according to claim 14, wherein the valve unit is arranged upstream of at least one of the gas exchange valve members of the internal combustion engine in the respective channel.

19. An internal combustion engine, comprising:
at least one gas flow channel;
a valve unit configured within the channel, wherein the valve unit at least one of influences and controls a gas flow, wherein the valve unit has at least one valve member for changing a cross-section of the gas flow channel through which a fluid can flow; and
a drive train for rotatingly driving the at least one valve member;
wherein the drive train has an input shaft and is coupled on an input side to a drive device for rotatingly driving the input shaft;
wherein the drive train has at least one valve member shaft, which is rotationally fixedly connected to the valve member;
wherein the drive train has at least one phase adjuster for drivingly coupling the input shaft to the valve member shaft;
wherein at least one of the phase adjuster and a rotational position of the input shaft relative to the valve member shaft can be varied;
wherein the valve unit is arranged in a fresh air path of the internal combustion engine and is configured for adjusting an exhaust gas recirculation rate of an exhaust gas recirculation device, which has a recirculation line connected to the fresh air path;
wherein the drive train has an actuatable coupling, which on the input side is rotationally fixedly connected to an input section of the input shaft, which on the output side is rotationally fixedly connected to an output section of the input shaft, which in a coupled state rotationally fixedly connects the two sections of the input shaft to each other, and in a decoupled state, allows rotational movements of the sections of the input shaft relative to each other,
wherein two valve members are provided; and
wherein the drive train has two separate valve member shafts, which each are rotationally fixedly connected to one of the valve members, and wherein the drive train has an additional phase adjuster for drivingly coupling the two valve member shafts.

20. The internal combustion engine according to claim 19, wherein the additional phase adjuster is configured as at least one of addition gearing, and planetary gearing, the sun gear of which is rotationally fixedly connected to the one valve member shaft, the planetary gears of which are mounted on a planetary gear carrier which rotationally fixedly connected to the other valve member shaft, and the annulus gear is fixable and rotatingly actuatable by means of an actuator for adjusting a rotational position of the two members relative to each other.

* * * * *